United States Patent Office 2,983,728
Patented May 9, 1961

2,983,728
N-ARALKYL-CAMPHIDINE DERIVATIVES

Kurt Rubinstein, Horsholm, Denmark, assignor to Aktieselskabet Pharmacia, Copenhagen, Denmark No Drawing. Filed Mar. 30, 1959, Ser. No. 802,665

Claims priority, application Sweden Mar. 29, 1958

6 Claims. (Cl. 260—293)

This invention relates to camphidine derivatives and methods of their preparation and more particularly to camphidine compounds useful as or in chemo-therapeutic preparations having a depressor activity upon the central nervous system in mammals.

Specifically the invention relates to N-substituted camphidines and acid addition and quaternary ammonium salts thereof.

The main object of the invention is to provide novel camphidine compounds and methods for the preparation thereof.

A more specific object of the invention is to provide novel N-substituted camphidines and acid addition and quaternary ammonium salts thereof and methods for their preparation.

A particular object of the invention is to provide novel N-aralkyl-camphidines and acid addition and quaternary ammonium salts thereof and methods for their preparation.

A more particular object of the invention is to provide novel chemotherapeutic N-aralkyl-camphidines and acid addition and quaternary ammonium salts thereof, said compounds having a depressor activity upon the central nervous system in mammals, and methods for their preparation.

A still more particular object of the invention is to provide novel chemotherapeutic N-aralkyl-camphidines and acid addition salts thereof having a reserpine-like depressor activity upon the central nervous system in mammals and a low toxicity and being useful as tranquilizers, and methods for their preparation.

These and other objects and the manner in which they are accomplished will become apparent to those conversant with the art from the following description of the general class of compounds and certain specific examples of particular members thereof as well as general and specific methods of their synthesis.

The novel compounds of the present invention are N-aralkyl-camphidines having the formula

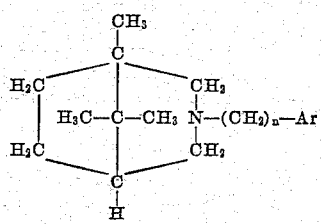

in which Ar represents an unsubstituted phenyl radical or a substituted phenyl radical and $n$ is a number from 1 to 3 and pharmacologically acceptable acid addition and quaternary ammonium salts of said camphidine derivatives.

Preferred novel compounds of the invention are N-aralkyl-camphidines having the formula

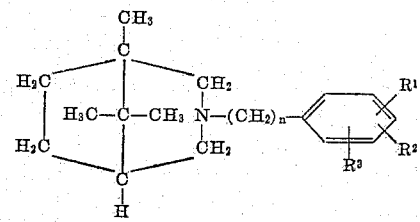

in which $n$ is a number from 1 to 3, especially 1, and $R^1$, $R^2$ and $R^3$ each represent a hydrogen or halogen atom, especially a chlorine atom, or an alkyl radical with not more than three carbon atoms, especially a methyl group, or an alkoxy radical with not more than three carbon atoms, especially a methoxy group, or a nitro group or an amino group, and in which $R^1$, $R^2$ and $R^3$ may represent the same or different of these substituents, and pharmacologically acceptable acid addition or quaternary ammonium salts of said camphidine derivatives. Still more preferred novel compounds of this type are N - monohalogeno - aralkyl - camphidines, especially N-monochloroaralkyl-camphidines, and their pharmacologically acceptable acid addition and quaternary ammonium salts.

The most preferred novel compounds of the invention are N-monochlorobenzyl-camphidines, especially N-m-chlorobenzyl-camphidines, and their pharmacologically acceptable acid addition salts, especially the hydrohalides, preferably hydrochlorides, and their quaternary ammonium salts.

The novel camphidine compounds of this invention may be given orally in the form of tablets, capsules and the like and are absorbed from the gastrointestinal tract of mammals. Their solutions in the usual solvents of medicines for injections may also be injected.

Generally stated the novel compounds of this invention are obtained by condensing an arylalkylhalogenide having the formula $$Hal—(CH_2)_n—Ar$$

in which $n$ is a number from 1 to 3 and Ar represents an unsubstituted or substituted phenyl radical with camphidine or camphoric acid imide, whereupon the condensation product obtained with camphidine may be converted in the usual manner known in the art into an acid addition or quaternary ammonium salt, whereas the condensation product obtained with camphoric acid imide is reduced to the corresponding N-aralkyl-camphidine which thereafter in the usual manner known in the art may be converted into an acid addition or quaternary ammonium salt. The condensation reaction is preferably carried out in the presence of an alkaline reacting condensation agent, especially an alkali metal hydroxide, which may be dissolved in an alcohol such as methanol or ethanol, but other alkaline reacting condensation agents such as alkali metal amides, f.ex. sodium amide, may also be used. The reduction of the condensation product obtained with camphoric acid imide as starting material is preferably carried out with a hydride, especially lithium-aluminium-hydride, but other known reduction methods may be used such as a catalytic hydrogenation or an electrolytic reduction.

Quaternary ammonium salts of the N-aralkyl-camphidines of the invention may also be obtained in a different way by quaternization in the usual manner of an N-alkylcamphidine by reaction with an arylalkylhalogenide having the formula $$\text{Hal}-(CH_2)_n-Ar$$

in which $n$ is a number from 1 to 3 and Ar represents an unsubstituted or substituted phenyl radical, whereupon the anion of the quaternary ammonium salt obtained in the usual manner may be replaced by a different anion.

The N-aralkyl-camphidines of this invention form pharmacologically acceptable acid addition salts with a variety of inorganic and organic acids including hydrochloric, hydrobromic, hydroiodic, sulfuric, phosphoric, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids such as methyl chloride, methyl bromide, methyl iodide, ethyl chloride, ethyl bromide, ethyl iodide, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene or propylene chlorhydrine, allyl chloride, methallyl bromide and crotyl bromide.

The following examples of specific compounds and methods will illustrate the manner in the general synthesizing procedure which may be applied to obtain particular members of the class of compounds discovered. It will be understood, however, that the following examples are not nor are they intended to be exhaustive of all compounds embraced by the present invention.

*Example I*

30 g. camphoric acid imide are dissolved in a solution of 11.3 g. potassium hydroxide, purity 85%, in 165.5 ml. absolute ethanol and 26.7 g. p-chlorobenzyl chloride are added. The mixture is shaken and maintained for 22 hours at room temperature and thereafter heated under reflux for 2 hours. The reaction product obtained is filtered, water is added to the filtrate and the aqueous solution is cooled, 23.7 g. of well-defined crystals of N-p-chlorobenzylcamphoric acid imide, M.P. 102–104° C., are obtained as precipitate.

A solution of 23.65 g. of this imide in 200 ml. of dry ether is slowly dripped while stirring to a mixture of 6.75 g. lithium aluminium hydride in dry ether. The mixture is maintained for 16 hours at room temperature and thereafter heated under reflux for 4.5 hours. The reaction product obtained is cooled and 8.4 ml. of water, thereafter 8.4 ml. of 15% aqueous sodium hydroxide and finally 29.5 ml. water are slowly added by dripping. The mixture is stirred 90 minutes at room temperature and the precipitate formed is filtered off and washed 5 times with ether, each time with 60 ml. The combined ether solution obtained is dried with magnesium sulfate and concentrated by removing the ether by distillation. The distillation residue is distilled under reduced pressure and the fraction boiling at 128–179° C./0.7–0.9 mm. Hg is collected and redistilled under reduced pressure. The fraction obtained at 119.5–134° C./0.8 mm. Hg consists of N-(p-chlorobenzyl)-camphidine which is a base.

The N-(p-chlorobenzyl)-camphidine obtained is dissolved in dry ether and treated with dry hydrogen chloride. The precipitate formed, 7.6 g., is collected and recrystallized from ether/ethanol. 5.9 g. N-(p-chlorobenzyl)-camphidine hydrochloride, M.P. 226–227° C., are obtained.

The hydrochloride obtained was used for the following laboratory tests with mice as test animals.

(1) Toxicity was determined as $LD_{50}$ in mg./kg. when intraperitoneally injected.

(2) The sedative action was determined by visual observation tests in which a number of groups of 3 mice were injected intraperitoneally with the minimum effective dose in mg./kg. The degree of sedation obtained was graduated by the numbers 1, 2 and 3 and the three values obtained in each group were summed up. The average value of all the sums obtained is a measure for the sedative action of the compound.

The toxicity of N-(p-chlorobenzyl)-camphidine hydrochloride was 250 mg./kg. The sedative activity of 20 mg./kg. was 7. With the compound a potentiation of an ethanol narcosis amounting to 38% was obtained.

The same tests were carried out with the following compounds prepared in an analogous manner.

A. N - (o - chlorobenzyl) - camphidine hydrobromide, M.P. 146–147° C., prepared from N-(o-chlorobenzyl)-camphidine, B.P. 132–140° C./1–1.5 mm. Hg, by reaction with hydrogen bromide, conversion of the hydrobromide into the hydroiodide, conversion of the hydroiodide into the hydrochloride and conversion of the latter into the hydrobromide. The toxicity of the hydrobromide was 405 mg./kg. and the sedative activity of 30 mg./kg. was 7. With the compound a potentiation of an ethanol narcosis amounting to 93% was obtained.

B. N - (m - chlorobenzyl) - camphidine hydrochloride, M.P. 233.6–235.6° C., prepared from N-(m-chlorobenzyl)-camphidine, B.P. 124–127° C./0.25–0.4 mm. Hg. The toxicity of the hydrochloride was 360 mg./kg. and the sedative activity of 30 mg./kg. was 7. With the compound a potentiation of an ethanol narcosis amounting to 123% was obtained.

C. N-benzyl-camphdine hydrochloride, M.P. 220° C., prepared from N-benzyl-camphidine, B.P. 150–152° C./1 mm. Hg. The toxicity of the hydrochloride was 295 mg./kg. and the sedative activity of 150 mg./kg. was 6.

D. N-(3,4,5-trimethoxy-benzyl)-camphidine hydrochloride, M.P. 166–169° C. The toxicity of this compound was 525 mg./kg. and the sedative activity of 150 mg./kg. was 5.

E. N-(β-o-chlorophenylethyl)-camphidine hydrochloride, M.P. 208–209° C., prepared from N-(β-o-chlorophenylethyl)-camphidine, B.P. 135–155° C./1 mm. Hg. The toxicity of the hydrochloride was 295 mg./kg. and the sedative activity of 100 mg./kg. was 7.

F. N-(o-methoxybenzyl)-camphidine hydrogensulfate, M.P. 165–166° C., prepared from N-(o-methoxybenzyl)-camphidine, B.P. 140–141.7° C./1.1 mm. Hg. The toxicity of the hydrogensulfate was 165 mg./kg. and the sedative activity of 100 mg./kg. was 5.

G. N-(γ-o-chlorophenylpropyl)-camphidine hydrochloride, M.P. 202–204° C., prepared from N-(γ-o-chlorophenylpropyl)-camphidine, B.P. 166–167° C./1 mm. Hg. The toxicity of the hydrochloride was 245 mg./kg. and the sedative activity of 50 mg./kg. was 6.

H. N-(β-o-methoxyphenylethyl) - camphidine hydrochloride, M.P. 206–207° C., prepared from N-(β - o-methoxy-phenylethyl)-camphidine, B.P. 135–150° C./0.1 mm. Hg. The toxicity of the hydrochloride was 225 mg./kg. and the sedative activity of 200 mg./kg. was 7.

I. N-(β-m-methoxyphenylethyl) - camphidine hydrochloride, M.P. 219–221° C., prepared from N-(β - m-methoxy-phenylethyl)-camphidine, B.P. 156–159° C./1 mm. Hg. The toxicity of the hydrochloride was 305 mg./kg. and the sedative activity of 150 mg./kg. was 7.

K. N-(β-3,4-dimethoxy-phenylethyl) - camphidine hydrochloride, M.P. 223.8–225.5° C., prepared from N-(β-3,4-dimethoxy-phenylethyl)-camphidine, B.P. 179–182° C./0.75 mm. Hg. The toxicity of the hydrochloride was 400–500 mg./kg.

*Example II*

A mixture of 60 g. camphidine hydrochloride, 100.5 g. of sodium carbonate, 500 ml. of absolute ethanol and 53.4 g. of m-chlorobenzyl chloride is heated 4 hours while stirring under reflux. The solid substance present in the reaction mixture is filtered off and washed with ethanol. The ethanol present in the combined ethanol solution is distilled off under reduced pressure and the distillation residue is distilled under reduced pressure. The fraction obtained at 124–127° C./0.25–0.4 mm. Hg consists of 80.6 g. N-(m-chlorobenzyl)-camphidine.

A solution of 79.6 g. N-(m-chlorobenzyl)-camphidine in 400 ml. dry ether is treated with dry hydrogen chloride and the solid substance precipitated is filtered off and washed with ether. The combined filtrate is treated with dry hydrogen chloride and the solid precipitate is filtered off and washed with ether and this treatment is repeated 4 times. The combined solid product obtained, M.P. 220–224° C., is purified by dissolution in 400 ml. absolute ethanol and precipitation with 200 ml. ether followed by a recrystallization from 750 ml. iso-propyl alcohol. 62.5 g. N-(m-chlorobenzyl)-camphidine hydrochloride, M.P. 233.6–235.6° C. are obtained.

This hydrochloride is identical with the hydrochloride of Example I B.

In an analogous manner N-(o-methoxybenzyl)-camphidine and the hydrogensulfate thereof which are identical with the products of Example I F are obtained.

The tests described in Example I were carried out with the following compounds prepared in an analogous manner.

A. N-(m-methoxybenzyl) - camphidine hydrochloride, M.P. 225–227° C., prepared from N-(m-methoxybenzyl)-camphidine, B.P. 142–145° C./1 mm. Hg. The toxicity of the hydrochloride was 305 mg./kg. and the sedative activity of 100 mg./kg. was 7.

B. N-(2,4-dichloro - benzyl) - camphidine hydrochloride, M.P. 205–207° C., prepared from N-(2,4-dichlorobenzyl)-camphidine, B.P. 147–149° C./0.25 mm. Hg. The toxicity of the hydrochloride was about 500 mg./kg. and the sedative activity of 50 mg./kg. was 7.

C. N-(m-methylbenzyl) - camphidine hydrochloride, M.P. 202-204° C., prepared from N-(m-methylbenzyl)-camphidine, B.P. 120–125° C./0.05 mm. Hg. The toxicity of the hydrochloride was about 300 mg./kg. and the sedative activity of 125 mg./kg. was 7.

D. N-(o - nitrobenzyl) - camphidine hydrochloride, M.P. 215–216° C., prepared from N-(o-nitrobenzyl)-camphidine, M.P. 69.4–71° C. The toxicity of the hydrochloride was about 300–400 mg./kg. and the sedative activity of 50 mg./kg. was 7.

*Example III*

5 g. N-(o-nitrobenzyl) - camphidine, Example II D, are dissolved in 30 ml. 6 N hydrochloric acid and 5 g. iron powder are slowly added in the course of 20 minutes. The mixture is maintained for 3 hours at room temperature and shaken repeatedly whereupon 20 ml. 6 N hydrochloric acid are added. After about 15 further hours at room temperature the solid substance present in the mixture is filtered off and washed with 25 ml. water. To the combined aqueous solution obtained 30% aqueous solution of sodium hydroxide is added until strong basic reaction is obtained, whereupon the solution is diluted with water to 300 ml. The diluted solution is extracted continuously for 4 hours with ether and the ether solution obtained is extracted 3 times with 10% aqueous solution of hydrogen bromide each time with 20 ml. The combined aqueous extract is evaporated at reduced pressure and treated several times with methanol and ether during the evaporation. The solid residue obtained is dissolved in 20 ml. methanol and reprecipitated by addition of 80 ml. ether. The product thus obtained consists of 1.6 g. N-(o-aminobenzyl)-camphidine di-hydrobromide, M.P. 240–270° C. When tested in the manner as described in Example I the product had a toxicity of 500–1000 mg./kg. and the sedative activity of 250 mg./kg. was 5.

*Example IV*

A mixture of a solution of 5 g. N-methyl-camphidine in 25 ml. ethanol and 5.3 g. p-chlorobenzyl-chloride is boiled for 24 hours under reflux whereupon the ethanol is distilled off at reduced pressure. The solid distillation residue which is of a slightly fatty character is dissolved in acetone and ether is added to the solution. After scraping the interior wall of the container and cooling the mixture in an ice box the crystals formed are filtered off and dried in a vacuum exsiccator over $H_2SO_4$. There are obtained 2.6 g. hygroscopic N-(p-chlorobenzyl)-camphidine-methochloride.

*Example IV*

5.1 g. methyliodide are added to a solution of 5 g. of N-(o-chlorobenzyl)-camphidine, prepared according to Example I, in 25 ml. absolute ethanol and the mixture is heated in an autoclave for 11 hours to 100° C. The ethanol and the excess of methyliodide is distilled off under reduced pressure. The residue is purified by dissolution in warm ethanol and reprecipitation with ether from the cooled solution followed by a recrystallization from methylethylketone and ether. 1.87 g. of N-(o-chlorobenzyl)-camphidine-methiodide, M.P. 172–1740° C. are obtained.

From the foregoing description of a novel class of compounds, particular exemplary members of the class and methods of synthesizing same, it will be understood that on the basis of the discovery and knowledge disclosed herein, other specific compounds can be made and variations in the methods of synthesis resorted to. Therefore the specific compounds and methods disclosed herein are to be considered in all respects as illustrative and not restrictive, the scope of the discovery being indicated by the appended claims rather than the foregoing description, and all specific compounds and variations and methods which come within the meaning and range of equivalency of the claims are therefore intended to be embraced therein.

What is claimed is:

1. A compound selected from the group consisting of compounds having a formula

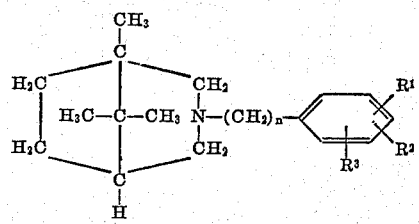

and the pharmaceutically acceptable acid addition salts thereof, wherein:

$R^1$, $R^2$ and $R^3$ are members selected from the group consisting of chlorine, methyl, methoxy, nitro and amino, and $n$ is an integer of 1 to 3.

2. N-monochlororobenzyl-camphidine

3. N-(m-chlorobenzyl)-camphidine.

4. The hydrochloride of N-m-chlorobenzyl-camphidine.

5. A pharmaceutically acceptable acid addition salt of N-monochlorobenzyl-camphidine.

6. A pharmaceutically acceptable acid addition salt of N-(m-monochlorobenzyl)-camphidine.

No references cited.